Jan. 26, 1965  G. W. BURGESS  3,167,188
RETRACTABLE OUTRIGGER AND THE LIKE
Filed Nov. 23, 1962  4 Sheets-Sheet 1

INVENTOR
GLEN W. BURGESS
BY *J.C. Wiessler*
ATTORNEY

Jan. 26, 1965 G. W. BURGESS 3,167,188
RETRACTABLE OUTRIGGER AND THE LIKE
Filed Nov. 23, 1962 4 Sheets-Sheet 2

INVENTOR
GLEN W. BURGESS
BY *J. C. Wiessler*
ATTORNEY

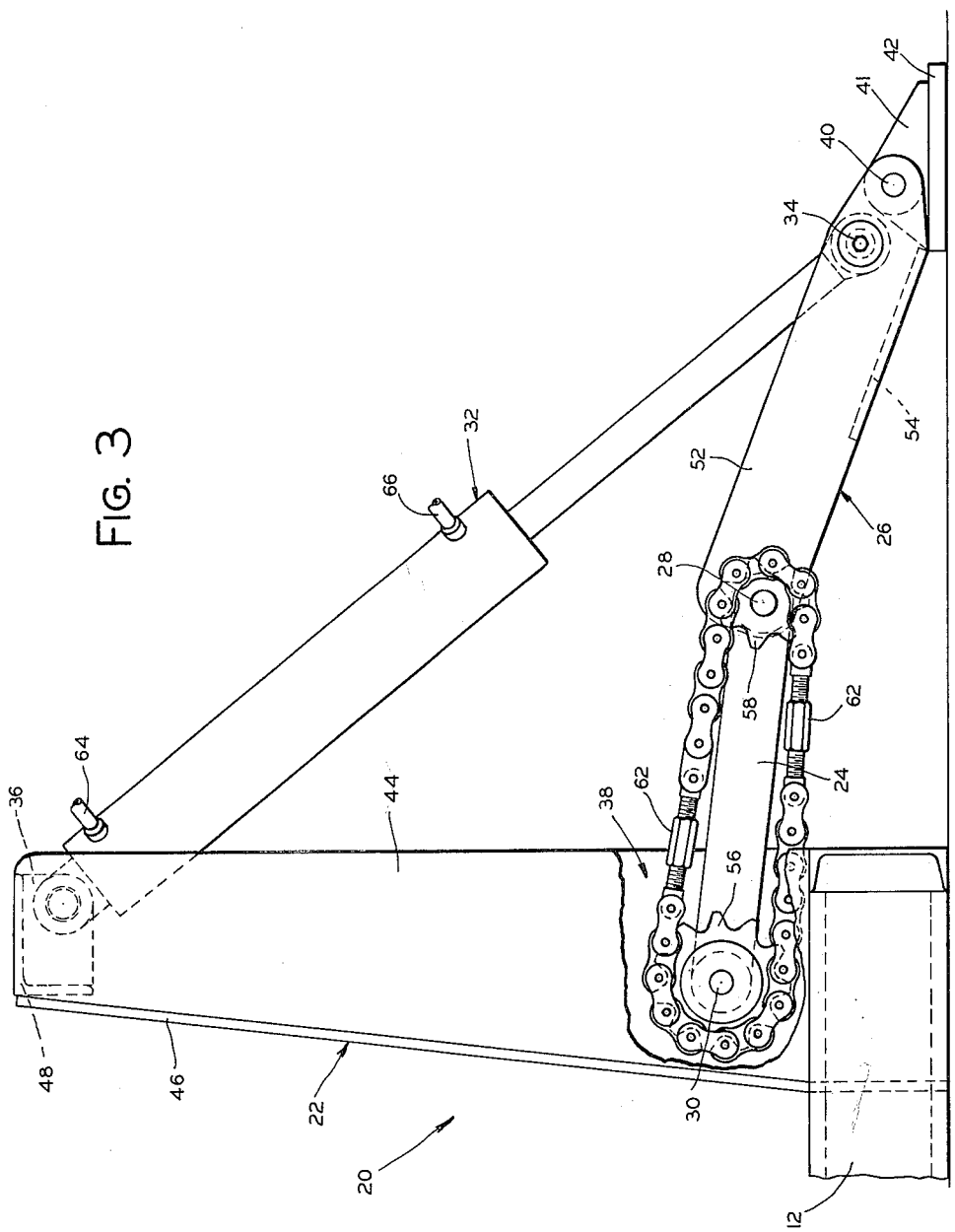

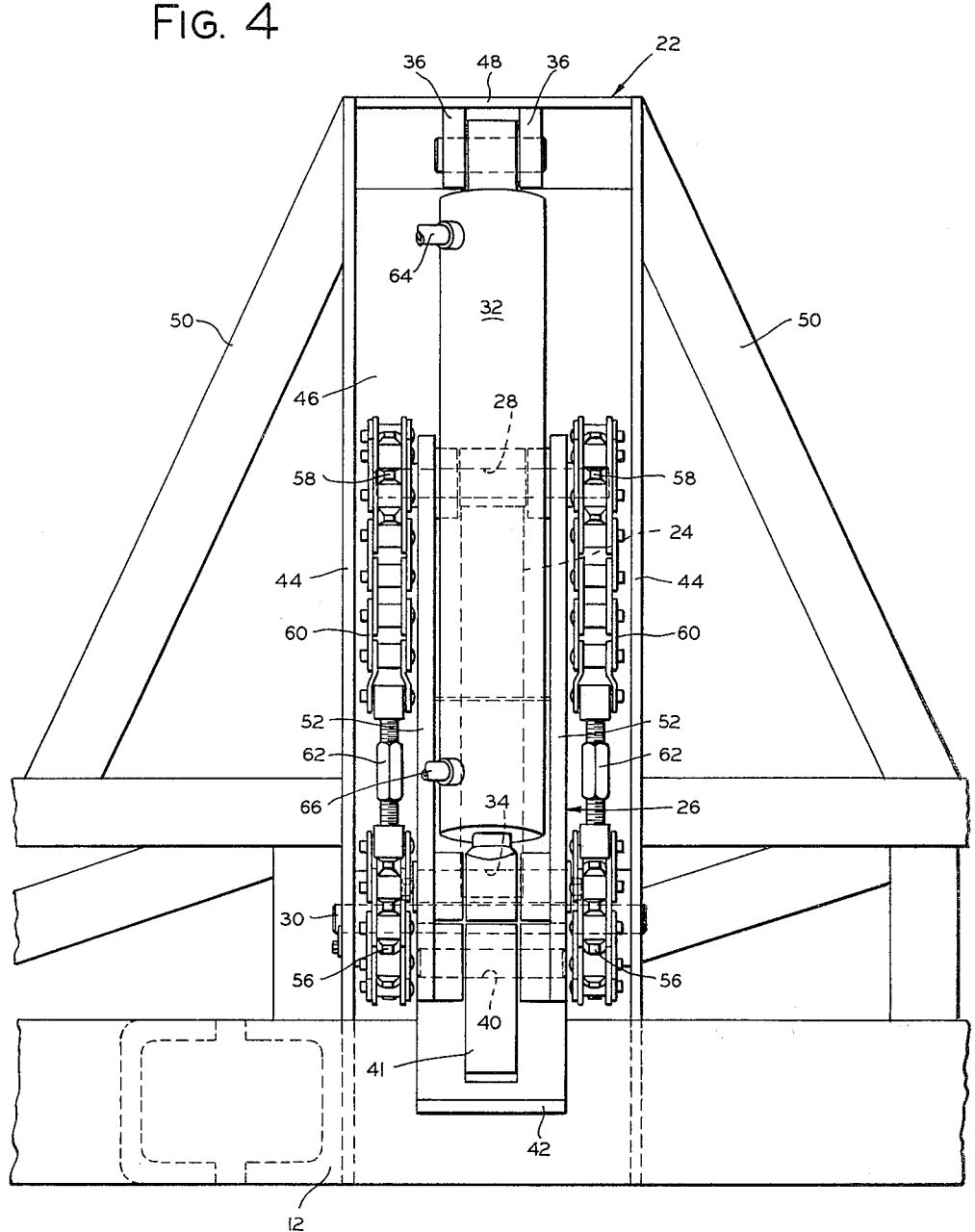

United States Patent Office 3,167,188
Patented Jan. 26, 1965

3,167,188
RETRACTABLE OUTRIGGER AND THE LIKE
Glen W. Burgess, Battle Creek, Mich., assignor to Clark
Equipment Company, a corporation of Michigan
Filed Nov. 23, 1962, Ser. No. 239,497
11 Claims. (Cl. 212—145)

This invention relates to retractable outriggers and the like, and more particularly to outriggers used for stabilizing vehicles and other devices.

During recent years it has become common practice to transport loaded trailer vans from one location to another by means of railroad flatcars. This system of transporting trailer vans, which is commonly referred to as "piggy-backing," presents a number of van handling problems, not the least of which is the loading and unloading of the trailer vans onto and from the railroad cars. A vehicle which holds substantial promise for economically loading and unloading trailer vans is disclosed in U.S. patent application, Serial No. 56,194, filed September 15, 1960, now Patent No. 3,119,506, January 28, 1964, in the name of John Bridge. The vehicle disclosed in the above-mentioned application includes load lifting and transfer means arranged so that a trailer van may be driven thereover, whereupon the lifting means is actuated to elevate the van above the adjacent rail car and the transfer means is then actuated to move the van transversely outwardly of the vehicle envelope and over the rail car upon which the van is deposited. Such movement of the trailer van outwardly of the side of the transfer vehicle produces a large moment force which tends to overturn the vehicle, and it is an important object of my invention to provide an improved outrigger construction suitable for use with such a transfer vehicle by means of which the aforesaid overturning moment is largely counteracted.

A primary object of my invention is to provide a generally improved retractable outrigger construction suitable for use with various types of vehicles and in other environments in which outriggers are useful.

A further object of my invention is to provide a retractable device which is of simple, compact and rugged construction.

In carrying out my invention in a preferred embodiment thereof I provide a pair of arms pivotally connected to each other adjacent one end of each arm. The other end of one of the arms is pivotally connected to a vehicle or other device and the other arm is pivotally connected to a double-acting fluid motor which is also pivotally connected to the vehicle or other device. The outrigger also includes means for folding and unfolding the two arms in relation to each other and to the vehicle; such means includes, in the embodiment disclosed herein, sprocket means secured to the vehicle, sprocket means secured to the outer arm, and endless sprocket chain means connecting the sprocket means so that pivotal movement of one of the arms in one direction results in a simultaneous pivotal movement of the other arm in the opposite direction.

The above and other objects, features and advantages of my invention will become more readily apparent to those skilled in the art when the detailed description which follows is taken in conjunction with the drawing wherein:

FIGURE 3 is similar to FIGURE 2 but shows the outrigger in an extended position; and FIGURE 4 is a front elevation of the outrigger as shown in FIG. 2.

Figure 1:
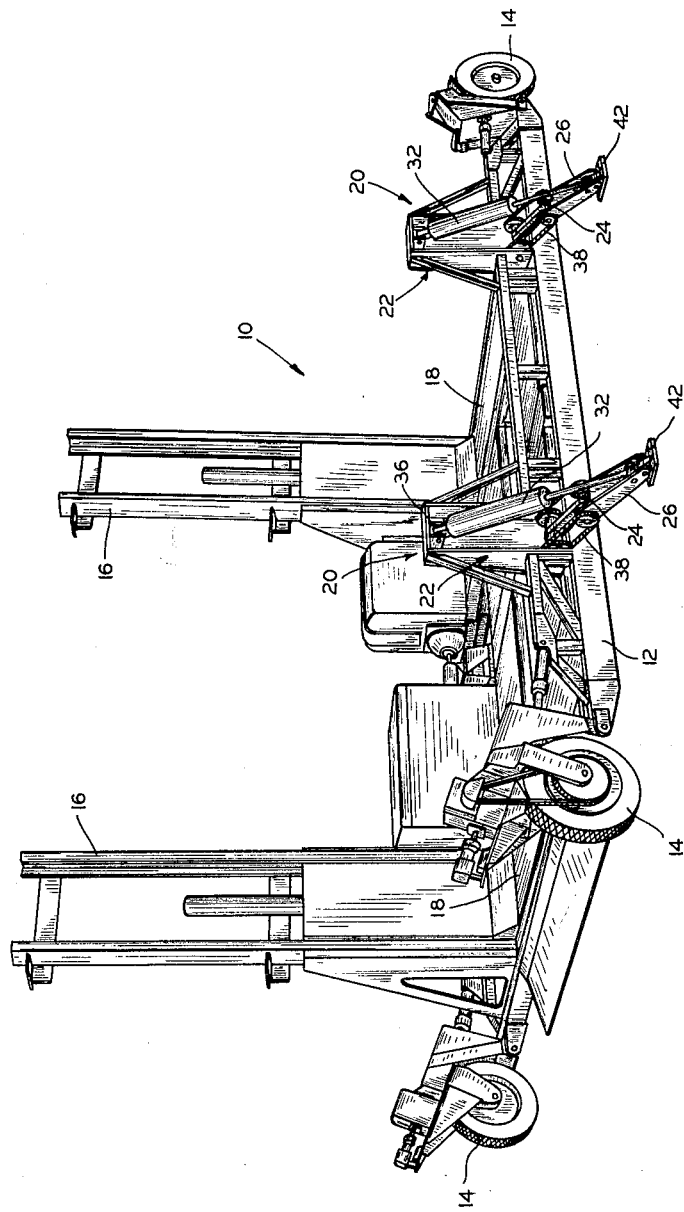
FIGURE 1 is a perspective view of a transfer vehicle embodying my invention.

Referring now to FIGURE 1, the numeral 10 denotes generally a transfer vehicle which is suitable for transferring a trailer van from the ground onto an adjacent railroad flatcar or vice versa. The transfer vehicle 10 includes a frame 12 which is supportable above the ground by four retractable wheels 14 disposed at the corners thereof. Mounted on the frame 12 is a pair of longitudinally spaced lift uprights 16, each of which includes a transversely extending load engaging platform 18. The load engaging platforms 18 may be actuated vertically by lift uprights 16, uprights 16 being synchronously actuatable transversely to the opposite side of the frame 12 by motor means, not shown. The vehicle 10 also is provided with a pair of retractable outrigger assemblies 20 which are mounted on one side of frame 12 in longitudinally spaced relation as shown. Since the transfer vehicle 10 is merely exemplary of one type of device with which the present invention may be used and, as such, forms no part of the present invention, further description thereof is unnecessary; a detailed description of this vehicle appears in the above-mentioned application.

Figure 2:
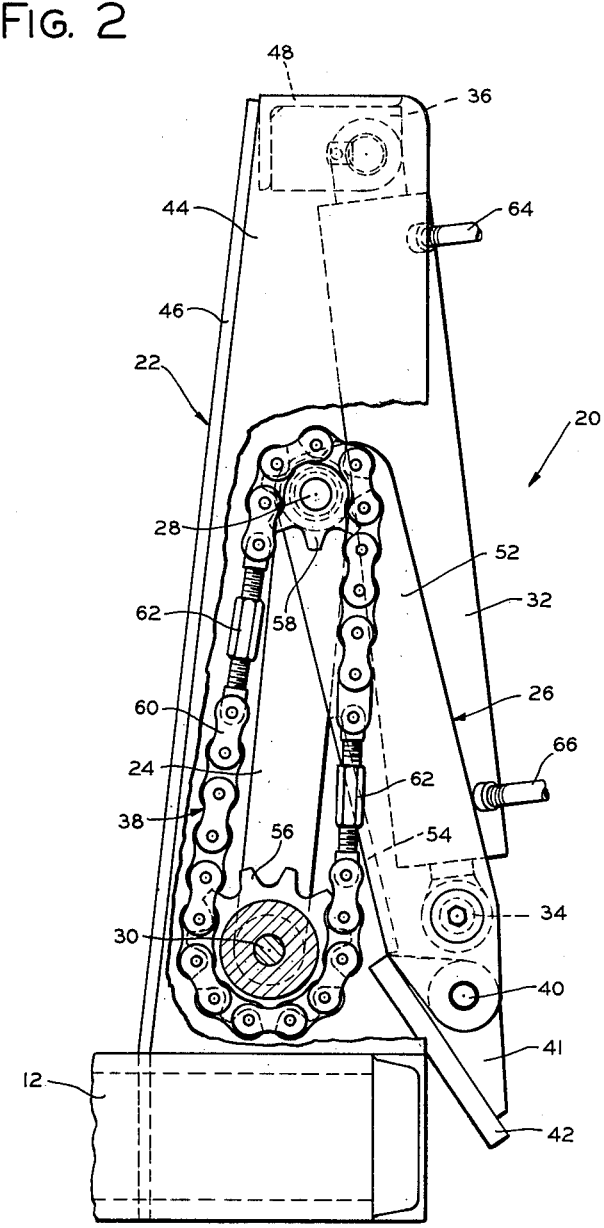
FIGURE 2 is an enlarged fragmentary side elevation showing my invention in retracted position.

Referring now to FIGURES 2, 3 and 4, the retractable outrigger assembly 20 includes a generally vertically disposed rectangular box-like support assembly 22 which is rigidly secured to frame 12 and opens outwardly from the side of the vehicle. Support assembly 22 includes a pair of side plates 44, a back plate 46 and a right angle channel member 48 which spans the top of the support assembly. These parts are preferably welded together and the assembly is welded to frame 12 and braced by elements 50. First and second arms 24 and 26 are pivotally connected to each other at adjacent ends by means of a shaft 28, the first arm 24 also being pivotally connected to the sides of support assembly 22 by means of a shaft 30, and the second arm 26 also being pivotally connected to the rod end of a double-acting cylinder-piston assembly 32 by means of a shaft 34. The second arm 26 includes a pair of laterally spaced plates 52 joined by a connecting plate 54 which preferably is welded to plates 52. The cylinder of actuator 32 is pivotally connected to the upper end of support assembly 22 by a pin and bracket connection 36, as shown. Pivotally connected to outer end of arm 26 by means of a shaft 40 and bracket 41 is a ground engaging pad 42.

A sprocket and chain assembly 38 connects the arms 24 and 26 at the opposite sides thereof and is operable to fold and unfold the arms. Assembly 38 includes a first pair of sprockets or wheel means 56 fixedly secured to side plates 44 on opposite sides of arm 24 by any suitable means, such as welding, and disposed substantially coaxially with shaft 30 which passes through both sprockets 56 and side plates 44. Assembly 38 also includes a second pair of sprockets or wheel means 58 rigidly secured to the outside of opposite ones of plates 52 substantially coaxially with shaft 28 which passes through them. The pairs of sprockets 56 and 58 are connected together by a pair of endless sprocket chains or cable means 60 which are trained over sprockets 56 and 58 as shown. Each sprocket chain 60 includes a pair of adjusting assemblies 62 which serve to adjust the tension thereof and also to adjust the angular relationship of arms 24 and 26 at shaft 28. More specifically, the adjusting assemblies 62 may be manipulated so that the obtuse angle formed by arms 24 and 26, as seen in FIGURE 3, may be either increased or decreased. It is to be noted that sprockets 56 have eleven teeth each while sprockets 58 have seven teeth each. This results in arm 26 pivoting through a greater arc than arm 24. By varying the ratio between the number of sprocket teeth the movement of the arms relative to each other can be controlled. For example, in the embodiment illustrated the ratio of sprocket teeth is eleven to seven or approximately 1.57 to 1 and arm 26 pivots through an arc of approximately 145° about shaft 28 while arm 24 pivots through an arc of approximately 92° about shaft 30, the ratio of these angles being approximately 1.57 to 1.

The fluid motor 32 is provided with a pair of fluid conduits 64 and 66 which are connected to a fluid pressure source by means of a suitable control valve (neither of which is shown) so that by manipulation of the control valve the operator may either extend or retract fluid motor 32.

For the purpose of illustration I will now describe the operation of my invention in conjunction with the transfer vehicle 10 shown in FIGURE 1. In order to load or unload trailer vans from a railroad flatcar the transfer vehicle is placed closely alongside the flatcar, and the retractable wheels 14 thereof are retracted so that the frame 12 rests on the ground. Now, in order to provide added stability to resist the overturning moment caused by supporting the trailer van from load engaging platforms 18 outwardly of the envelope of the transfer vehicle 10, the retractable outrigger assemblies 20 are extended from the retracted position shown in FIGURE 2 to the extended position shown in FIGURES 1 and 3. In order to accomplish extension of outrigger assemblies 20 from the position shown in FIGURE 1, the fluid motors 32 are extended by conducting pressure fluid to the head end of fluid motors 32 through conduits 64. The fluid motors 32 are then extended until the ground engaging pads 42 contact the ground or some other suitable support such as the adjacent rail of the railroad track. Extension of fluid motors 32 tends to cause arms 24 to pivot in a clockwise direction about shafts 30. The clockwise movement of arms 24 causes chains 60 to "walk" around sprockets 56 which are fixed to side plates 44. This "walking" of chains 60 around sprockets 56 causes a pull to be exerted on one portion of the chains 60 connecting sprockets 56 with sprockets 58 with the result that sprockets 58 are rotated about shafts 28 in a counterclockwise direction. Since sprockets 58 are fixed to arms 26, the arms will pivot about shafts 28 in a counterclockwise direction, the combination of the movements of arms 24 and 26 resulting in an unfolding thereof from the position shown in FIGURE 2 to the position shown in FIGURE 3. It is to be noted that the extension of the fluid motors may be stopped at any intermediate position and the retractable outrigger assemblies 20 will be rigidly held in a partially extended position due to the sprocket and chain assemblies 38 holding arms 24 and 26 stationary relative to each other.

In order to retract outrigger assemblies 20 the procedure for extension thereof is reversed. That is, the fluid motors 32 are retracted which causes arms 24 to pivot in a counterclockwise direction which in turn through the sprocket and chain assemblies 38 causes arms 26 to pivot about shafts 28 in a clockwise direction so that the outrigger assemblies will return to the position shown in FIGURE 2 from the position shown in FIGURE 3.

The preceding detailed description in which I have disclosed and described a particular form of a retractable outrigger is intended to be exemplary only since various applications of my invention as well as modifications and changes in the construction and relative arrangement of parts thereof will occur to persons skilled in the art. For example, my invention contemplates any suitable implementation of the broad concept of pivotally connecting a first arm to a support, pivotally connecting a second arm to the first arm, providing means connected to the support and the second arm for simultaneously pivoting one of the arms in one direction when the other arm is pivoted in the opposite direction, and motor means connected between the arms or between either arm and the support. I do not, therefore, intend to be limited, except by the scope and spirit of the claims appended hereto.

I claim:

1. For use with vehicles and the like, a retractable outrigger comprising first and second arms pivotally connected to each other, said first arm also being pivotally connected to the vehicle, motor means connected to the vehicle and to said second arm, and separate means responsive to the actuation of said motor means for pivoting one of said arms in one direction and simultaneously pivoting the other of said arms in the opposite direction, said separate means including a first sprocket fixed to the vehicle, a second sprocket fixed to the said second arm and a sprocket chain connecting said sprockets.

2. A device comprising support means, arm means pivotally connected to said support means, said arm means being jointed for folding movement intermediate the ends thereof, motor means connected between said support means and said arm means and means responsive to said motor means connected to said support means and to said arm means for folding and unfolding said arm means, said folding and unfolding means including first wheel means fixed to said support means at said pivot connection of said arm means to said support means, second wheel means connected to said arm means at said joint of said arm means and means connecting said first and second wheel means to provide relative rotation therebetween upon actuation of said motor means.

3. For use with vehicles and the like, a retractable outrigger comprising first and second arms pivotally connected to each other at adjacent ends, said first arm being also pivotally connected to the vehicle, motor means connected to said second arm and to the vehicle, first wheel means fixedly secured to the vehicle, second wheel means fixedly secured to said second arm at said adjacent end, and means connecting said wheel means so that pivotal movement of one of said arms in one direction causes pivotal movement of the other of said arms in the opposite direction.

4. A retractable outrigger assembly comprising a support assembly, a first arm pivotally connected to said support assembly, a second arm pivotally connected to said first arm, a double-acting motor pivotally connected to said support assembly and said second arm, a first sprocket fixedly secured to said support assembly, a second sprocket fixedly secured to said second arm, and a sprocket chain reeving said sprockets so that pivotal movement of one of said arms in one direction results in a simultaneous movement of the other arm in the opposite direction.

5. An assembly as set forth in claim 4 wherein said first sprocket is disposed substantially coaxially with the pivotal connection of said first arm with said support assembly and said second sprocket is disposed substantially coaxially with the pivotal connection between said arms.

6. For use with a vehicle, a retractable outrigger assembly comprising first and second arms first pivotally connected to each other at adjacent ends, said first arm being second pivotally connected to the vehicle, a double-acting fluid motor pivotally connected at one end to one of said arms and pivotally connected at the other end to the vehicle in spaced relation to said second pivotal connection, a first sprocket fixedly secured to the vehicle and disposed substantially coaxially with said second pivotal connection, a second sprocket fixedly secured to said second arm and disposed substantially coaxially with said first pivotal connection, and a sprocket chain reeving said sprockets.

7. For use with vehicles and the like, a device comprising a first arm pivotally connected to the vehicle, a second arm pivotally connected to said first arm, motor means pivotally connected to the vehicle and one of said arms, and means for folding and unfolding said arms, said latter means including a first wheel fixed to the vehicle substantially coaxially with the pivotal connection of said first arm with the vehicle, a second wheel fixed to said second arm substantially coaxially with the pivotal connection of said second arm with said first arm and means connecting said wheel means so that pivotal movement of one of said arms in one direction results in a simultaneous pivotal movement of the other of said arms in the opposite direction.

8. A retractable outrigger assembly comprising a support assembly, first and second arms first pivotally connected to each other at adjacent ends, said first arm being second pivotally connected to said support assembly, a double-acting fluid motor pivotally connected between said second arm and said support assembly, a first sprocket fixedly secured to said support assembly and disposed substantially coaxially with the said second pivotal connection, a second sprocket fixedly secured to said second arm and disposed substantially coaxially with the said first pivotal connection, a sprocket chain reeving said sprockets so that when one of said arms pivots in one direction the other of said arms simultaneously pivots in the opposite direction, and a ground engaging pad connected to said second arm.

9. A retractable outrigger assembly comprising a support assembly, first and second arms pivotally connected to each other adjacent one of their ends, said first arm being pivotally connected adjacent the other end thereof to said support assembly, a double-acting fluid motor pivotally connected at one end to said second arm adjacent the other end thereof and pivotally connected at the other end to said support assembly at a point spaced from the said pivotal connection of said first arm with said support assembly, a sprocket and chain assembly for folding and unfolding said arms, said last-mentioned assembly including a first pair of sprockets fixedly secured to said support assembly on opposite sides of said first arm and disposed substantially coaxially with the said pivotal connection of said first arm with said support assembly, a second pair of sprockets fixedly secured to said second arm on opposite sides thereof and disposed substantially coaxially with the said pivotal connection between said arms, a pair of sprocket chains, one of said chains being trained over the sprockets on one side of said arms and the other of said chains being trained over the sprockets on the other side of said arms, said chains and sprockets cooperating so that when one of said arms is pivoted in one direction the other of said arms is simultaneously pivoted in the opposite direction and adjusting means connecting the ends of said chains for adjusting the tension of said chains and the angular relationship of said arms, and a ground engaging pad pivotally connected to the said other end of said second arm.

10. A device comprising a support member, a first arm pivotally connected to said support member, a second arm pivotally connected to said first arm, motor means pivotally connected to said support member and said second arm for actuating said arms between two extreme positions, and means connected to said support member and said second arm and responsive to the actuation of said motor means for pivoting one of said arms in one direction and simultaneously pivoting the other of said arms in the opposite direction, said support member, said arms and said motor forming a rigid structure at any actuated position of said motor, said last-mentioned means including a sprocket fixed to the said support member, a sprocket fixed to the said second arm and a sprocket chain connecting the said sprockets.

11. A retractable outrigger comprising a support member, a first arm pivotally connected to said support member, a second arm pivotally connected to said first arm, a double-acting fluid motor pivotally connected to said support member and said second arm for actuating said arms between a retracted position and an extended position, and means connected to said support member and said second arm so that when one of said arms pivots in one direction the other of said arms pivots in the opposite direction and said support member, said arms and said motor form a rigid structure at any actuated position of said motor, said last-mentioned means including first wheel means secured to said support member, second wheel means secured to said second arm and flexible tension means connecting said wheel means.

References Cited in the file of this patent
UNITED STATES PATENTS

| 1,869,622 | Rowe | Aug. 2, 1932 |
| 3,051,323 | Kuhlenechmidt et al. | Aug. 28, 1962 |
| 3,100,049 | Garnett | Aug. 6, 1963 |